Oct. 8, 1968    G. W. BARTON, JR., ET AL    3,405,326
MAGNET SWEEP CONTROL CIRCUIT
Filed June 4, 1965
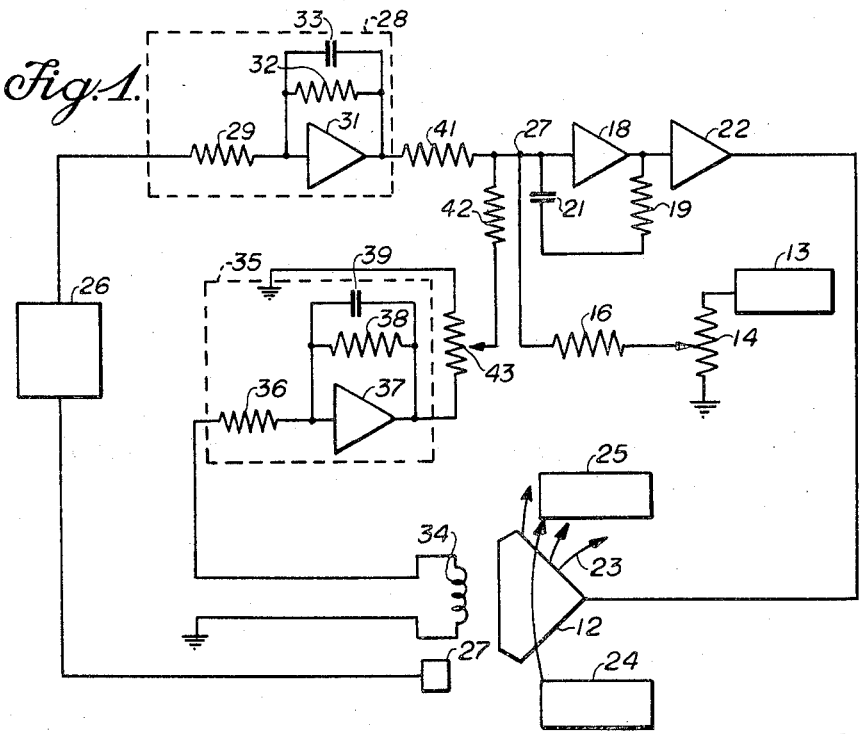
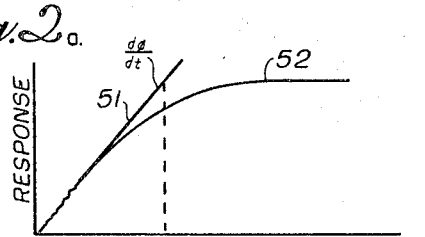
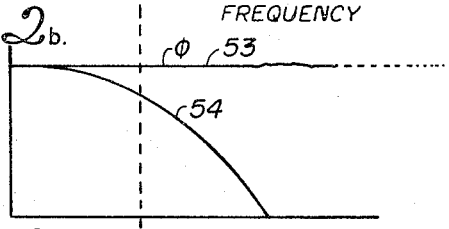
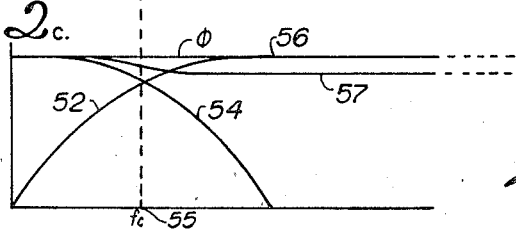
INVENTORS
GEORGE W. BARTON JR.
RONALD J. DUPZYK
BY
Robert A. Anderson
ATTORNEY United States Patent Office 3,405,326
Patented Oct. 8, 1968

3,405,326
MAGNET SWEEP CONTROL CIRCUIT
George W. Barton, Jr., Alamo, and Ronald J. Dupzyk, Livermore, Calif., assignors to the United States of America as represented by the United States Atomic Energy Commission
Filed June 4, 1965, Ser. No. 461,562
8 Claims. (Cl. 317—123)

The present invention relates to feed-back control techniques. More particularly, this invention entails method and apparatus for the combining of rate analog feed-back signals with position analog feed-back signals in a manner to form an improved composite feed-back signal.

In many servomechanism systems, it is desirable to have uniformly good low frequency and high frequency response. In general, this requires that transducer units employed to monitor the output of the servo system have excellent frequency response characteristics over the band of frequencies covering the desired range of operation. Generally this requires that the transducer must simultaneously be position sensitive in order to have a good low frequency response and velocity sensitive in order to have a good high frequency response. As it turns out in practice, position sensitive transducers generally perform poorly at higher frequencies. Conversely, available velocity sensitive transducers generally perform poorly at the lower frequencies.

As a solution to this problem, the present invention provides the following approach. In a first of at least two feed-back control loops there is generated a first signal whose amplitude closely follows the time rate of change of the output function of a servomechanism system. This would generally be achieved with a rate or velocity sensitive transducer such as an inductive pickup coil used to monitor the time rate of change of a magnetic field. This first signal is then attenuatively modified according to a predetermined frequency response "roll-off," i.e., decreasing amplitude response, curve relationship. The "roll-off" modification of an electrical signal, such as from an inductive pickup coil as proposed above, typically is accomplished with an operational amplifier or other appropriate electronic attenuative means. The nature of a rate sensitive transducer generally is such that it has an inherent fixed frequency response "roll-on" increasing amplitude response rate over its full operable frequency range. By providing for absolute value of the above-mentioned "roll-off" rate to be substantially equal to the "roll-on" rate of the velocity sensitive transducer, the rolled-off portion of the signal from the velocity sensitive transducer will be directly analogous to the instantaneous position of the servomechanism output. In effect this is essentially an integrative operation performed on a differentiated function to again provide the original undifferentiated function.

Simultaneous with the above-mentioned operations in the first feedback control loop, there is generated in a second feedback control loop a second signal whose amplitude closely follows the instantaneous position or amplitude of the above-mentioned output function of a servomechanism system. This is generally achieved with a positive sensitive transducer such as a Hall-effect transducer used to monitor the instantaneous strength of a magnetic field in a magnet. This second signal then is similarly attenuatively modified by an appropriate "roll-off" operation wherein the "roll-off" rate is substantially the same as in the roll-off modification of the above-mentioned first feedback control loop. As mentioned in conjunction with the first feedback loop, the roll-off modification of an electrical signal, typically is achieved with electronic attenuative means such as an operational amplifier.

Thus far there has been described a first feedback control loop which has a linear composite frequency response to the output of a servomechanism system over an upper range of frequencies but whose frequency response blends into a predetermined roll-on rate at a lower band of frequencies. Also there has been described a second feedback control loop which has a linear composite frequency response to the output of the same servomechanism system over a lower range of frequencies but whose frequency response curve blends into a predetermined roll-off rate at an upper band of frequencies.

The two above-mentioned attenuative modification steps are controlled such that upper half-power or three decibel response frequencies of the above-mentioned first and second feedback loops will coincide.

Next the two signals from the first and second feedback control loops are combined or multiplexed and their amplitude appropriately relatively adjusted.

This feedback system is capable of supplying a composite feedback signal linearly over a band of frequencies including both the above-mentioned lower range of frequencies of the second feedback loop which employs a position sensitive transducer and the above-mentioned upper range of frequencies of the feedback loop which employs the rate sensitive transducer. The combining or multiplexing of electrical signals typically is achieved with an appropriate summing network such as two high impedance resistors feeding into a low impedance load. With this improved feedback signal, excellent servomechanism control is attainable.

The manner in which feedback control has been enhanced may be fully appreciated by considering the following. As mentioned above, position sensitive transducers generally perform poorly at the upper frequencies. The attenuative roll-off modification described above in conjunction with the second feedback control loop serves to nullify this poor high frequency region of operation. Also, as mentioned above, rate or velocity sensitive transducers generally perform poorly in low frequency regions of operation. The attenuative roll-off modification described above in conjunction with the first feedback control loop serves tto convert the upper frequency region of the rate signal to be analogous to the position of the output of the servomechanism while it leaves the lower frequency region of this signal in its "already attenuated" nullified condition. This "already attenuated" condition is readily self-explained by above-mentioned inherent roll-on rate characteristic curve of a velocity sensitive transducer.

In many mass spectrometric techniques currently in vogue, the strength of a magnetic field is continuously varied so as to sweep a mass spectrum of charged particles past an analyzer slit. The magnitude of the field is measured and this measurement is used in a feedback control arrangement. Magnetic field measuring devices presently available in the art either possess troublesome noisy regions or have a limited usable frequency range. When these measuring devices are used in magnet sweep control arrangements, the noise or limited frequency band of the detected signals tends to degrade overall feedback control performance.

As noted supra, in the present invention, two types of gaussmeters are uniquely combined to measure the magnet field over a wide band of frequencies. To summarize, these are first, the Hall-effect differential gaussmeter and, second, the induction coil gaussmeter. The Hall-effect differential gaussmeter is a position-sensitive-type transducer which tends to have a noisy high-frequency region. The induction coil gaussmeter, which inherently has a 6 db per octave "roll-on" rate characteristic, is a rate-sensitive-type transducer which tends to have a noisy low-frequency region. The noisy high-frequency region of the Hall-effect probe is "rolled off" at a 6 db per octave rate. The high frequency region of the output signal from the induction coil is also "rolled off" at 6 db per octave rate. But since this induction coil already had a 6 db per octave "roll-on" rate, the cumulative effect is to provide a high-frequency region, with a flat, i.e., uniform, frequency response. Also, since the noisy low-frequency region of the coil is already attenuated by the inherent "roll-on" nature of the coil, noise appearing in this low-frequency region of the induction coil will become insignificant when combined with the signal from the Hall-effect probe.

The appropriately "rolled off" signals from the two gaussmeters are then combined in a summing network to provide a single, composite, relatively noise-free feed-back signal over a wide band of frequencies. This clean multiplexed control signal then can be used in a feed-back control circuit to provide high-quality, high-speed, stable magnet sweep control.

Prior to this concept of combining the feedback signals from both a position sensitive transducer and a velocity sensitive transducer, control of magnet field sweeps was generally less than satisfactory. In one common system the magnet field could be swept at rates in the range of 0.005 cycle per second up to 0.1 cycle per second, using current control. However, this scheme had the serious disadvantage that there is not a direct linear relationship between current and magnetic field strength because of eddy currents, magnetic hysteresis, and stray inductance and capacitance. In feed-back arrangements employing only the Hall-effect device, tolerable sweep control could be achieved only over the sweep frequency range from 0.005 cycle per second up to 0.3 cycle per second. Also there was a loss in fidelity of the higher frequency components of the feed-back signal.

Magnet sweep control circuits employing a field sensing coil had the dual disadvantage that lower useful frequency operation was approximately 0.1 cycle per second although they could operate up to 10 cycles per second, and there was no effective DC control of the magnetic field, i.e., the average value of the field strength was uncontrolled and could vary radically even though there was close control upon the alternating component of magnetic field.

By employing techniques in accordance with the present invention in a particular magnetic field control system such as mentioned above, there has been provided a sweep control system operable over the frequency range from 0.005 cycle per second to 10 cycles per second with concomitant excellent control of the quiescent value of magnetic field strength.

It is therefore an object of the present invention to provide a feedback control method and apparatus operable over an extended frequency range.

A further object of this invention is to provide a method and apparatus for multiplexing position analogous and velocity analogous feedback signals.

Still another object of this invention is to provide for low frequency stabilization in a magnet sweep control circuit.

A still further object of the present invention is to provide a relatively noise-free extended-frequency range feedback signal in control circuitry.

These and other objects of the present invention will become more apparent in light of the following description and the accompanying drawings in which:

FIGURE 1 schematically depicts a preferred embodiment of the present invention as used in a magnet sweep control circuit;

FIGURE 2 graphically depicts the "roll-off" and multiplexing operations of the present invention; and FIGURE 3 generically depicts apparatus of the present invention in block diagram form.

Reference is made to FIGURE 1 which shows a complete sweep circuit 11 for controlling the magnetic field of the deflection magnet 12 of a mass spectrometer. Sweep generator 13 produces a periodic electrical signal such as a sine wave or a triangular shaped wave variable over the range, for example, from 0.1 cycle per second to 10 cycles per second. This signal is directed to a summing junction 17, using, if necessary, an amplitude adjusting device such as potentiometer 14 coupled from the output terminal of generator 13 to ground and through a series summing circuit resistor 16. From junction 17 the periodic signal is fed to and is amplified by voltage amplifier 18 which has a parallel feedback circuit path consisting of resistor 19 and capacitor 21 connected in series and coupled between the output and input of amplifier 18. The signal is further amplified by power amplifier 22 and then is fed to the current coils (not shown) of a deflection magnet 12. As the magnitude of the periodic signal changes, the magnitude of the magnetic field generated by magnet 12 also changes causing the spectrum of ions 23 from ion source 24 to be continuously and alternately swept past an analyzer slit (not shown) associated with photomultiplier 25 used as a detector in the mass spectrometer.

The circuit described to this point is descriptive of typical conventional magnet sweep circuitry for purposes of illustrating a typical application of the invention. The description to follow will set forth circuitry in which the signals from the Hall-effect gaussmeter and the induction coil gaussmeter are uniquely "rolled off" and combined to provide the heretofore unavailable "clean" feedback signal over an extended frequency range which signal is used to obtain improved control over the conventional magnet sweep circuit, in accordance with the invention.

In FIGURE 1, there is shown a Hall-effect differential gaussmeter 26, and associated probe 27 disposed in the field of magnet 12 which in combination sense the strength of the magnetic field generated by magnet 12 and transmits an electrical signal proportional to the magnetic field strength, to operational amplifier 28. Amplifier 28 is comprised of input resistor 29, high-gain DC (direct current) amplifier 31, and the parallel combination of feedback resistor 32 and capacitor 33 coupled between the output and input of amplifier 31. Induction coil 34, which is placed in the magnetic field of magnet 12, senses the time rate of change of the magnetic field and sends an electrical signal whose amplitude is proportional thereto to operational amplifier 35. Amplifier 35 is comprised of input resistor 36, high gain DC amplifier 37, and the parallel combination of feedback resistor 38 and capacitor 39. Without resistor 38 the output of amplifier 35 would also be a measure of the magnetic field strength, but with the abovementioned disadvantage of poor sensitivity and high noise level at low frequencies.

Now, operational amplifier 28 is devised to roll off, at a 6 decibel per octave rate, the noisy high frequency region of the signal from gaussmeter 26. Similarly, operational amplifier 35, by virtue of resistor 38 and capacitor 39 coupled in parallel from input to output thereof, serves to roll off, also at a 6 decibel per octave rate, the high frequency region of the signal from coil 34. It has been found that by making the product of the resistance of resistor 32 and the capacitance of capacitor 33 equal to the product of the resistance of resistor 38 and capacitor 39, the upper three decibel attenuation point, generally designated as the half-power frequency or the corner frequency, of the composite feedback loop which includes amplifier 28 will coincide with the lower three decibel attenuation point of the composite feedback loop which includes amplifier 35. Now, by combining the signals from the feedback loops through resistor 41 and resistor 42, respectively, and by adjusting their amplitudes to be equal by selectively positioning the center tap terminal of potentiometer 43, a "clean" composite feedback signal is obtained over a flat, broadband noise-free frequency region. The junction between resistors 41 and 42 is connected to junction 17 to close the feedback loop. At this junction 17, the feedback signal, which is made to be opposite in polarity to the magnet drive signal from sweep generator 13, combines with the drive signal to provide an error signal for feedback control operation of the conventional sweep circuit. Note that amplifiers 28 and 35 can be replaced by equivalent roll-off device provided with appropriate input and output channels and which exhibit a frequency response characteristic which approximates the relationship $$\frac{1}{jw\tau+1}$$

where $w=2\pi$ times frequency, and $$\tau=\frac{1}{2\pi \times (\text{corner frequency})}$$

In this case the corner frequency is the half-power point of the response curve of the amplifier.

In one practical embodiment of the present invention, the following components and values were used:

Resistors 32 and 38 _____ 10 megohms.
Capacitors 33 and 39 _____ 0.1 microfarad.
Resistor:
   29 _____ 300 kilohms.
   36 _____ 10 kilohms.
   41 _____ 300 kilohms.
   42 _____ 20 kilohms.
Potentiometer 43 _____ 300 kilohms.
Resistor 19 _____ 5 megohms.
Capacitor 21 _____ 0.01 microfarad.
Resistor 16 _____ 22 kilohms.
Potentiometer 14 _____ 300 kilohms.
Gaussmeter 26 _____ Model 240 Incremental Gaussmeter manufactured by Bell Inc., Columbus, Ohio.
Induction coil 34 _____ 1000 turns of No. 16 wire wound to intercept 10 square inches of magnetic field.
Amplifiers 31 and 37 _____ Model USA-3 manufactured by Philbrick Researches, Inc., Boston, Mass.

FIGURE 2, consisting of parts A, B, and C, graphically illustrates the operation of the circuit of FIGURE 1. Each of FIGURES 2A, 2B and 2C has a frequency scaled abscissa and a relative-amplitude scaled ordinate. Curve 51 of FIGURE 2A represents the output voltage generated across coil 35 in response to a changing magnetic field. Curve 52 of FIG. 2A represents the output voltage of amplifier 35 as it responds to an input voltage 51. In this amplifier resistor 38 and capacitor 39 were selected to impart a six decibel per octave "roll-off" rate to amplifier 35 at frequencies above a predetermined half-power frequency ($f_c$).

As was explained above, coil 34 inherently has a six decibel per octave "roll-on" rate. The combination of this 6 db "roll-on" rate with the 6 db per octave "roll-off" rate of amplifier 35 produces an upper frequency flat response output signal from amplifier 35 as shown by curve 52. Other equivalently compensating roll-off and roll-on attenuation factors can be used similarly.

Curve 53 shows the output signal from the Hall-effect device 26. It is seen that this Hall-effect device 26 has essentially a flat response although the device tends to be noisy in its upper frequency region. Curve 54 shows the output signal of amplifier 28 as it responds to the input signal from Hall-effect device 26. Resistor 32 and capacitor 33 have been selected to impact a 6 decibel per octave "roll-off" rate frequency characteristic to amplifier 28 thus resulting in the output response as shown by curve 54. By rolling off the high frequency end of the Hall-effect device, high frequency noise effects are thereby suppressed.

By selecting resistor 32 and capacitor 33 to have a resistance-capacitance product equal to the resistance-capacitance product of resistor 38 and capacitor 39, the half-power point 55 of the two amplifiers 35 and 28 will coincide as shown in FIG. 2C.

The respective outputs of amplifiers 35 and 28 are combined at the junction of summing resistors 41 and 42. Now with this common three decibel point, the summation of the two signals provides a composite flat frequency response feedback signal as represented by curve 56. Should the amplitude of these two signals be unequal such that a composite frequency response in the nature that shown by curve 57 results, the relative amplitudes may be adjusted by appropriate manipulation of potentiometer 43, or otherwise, to provide the ideal flat response indicated by curve 56.

The significance of this signal represented by curve 56 is, as pointed out above in conjunction with FIGURE 1, that heretofore unattainable wide frequency band feedback control may be attained.

FIGURE 3 illustrates, in block diagram form, the broad concept of the present invention. To wit, a high-frequency-deficient position-analogous feedback signal with a low-frequency-deficient velocity analogous feedback signal are multiplexed to provide a composite broadband feedback signal. As mentioned previously, transducers which give a direct reading of an output signal generally have a degraded high frequency region. Conversely transducers which respond to the time rate of change of an output signal generally exhibit a poor low frequency response. This roll-off combination process, described in detail in conjunction with FIGURE 1, serves to eliminate these frequency response deficiencies.

In FIGURE 3, a reference signal is impressed on terminal 61 and appears at the error signal terminal 62 of operational unit 63 which performs the operation designated as G. Such operations generally include amplification and attenuation whereby unit 63 would be an amplifier and a signal attenuator respectively. Unit 63 generates an output signal Z, which is the controlled variable in this case, in response to the input error signal impressed on terminal 62. Transducer 66 provides an output signal at terminal 67 which is proportionate to the time rate of change of output Z. Roll-off amplifier 68 is fashioned to have a half-power frequency $f_c$ or corner frequency as it is often called, and a roll-off rate R at frequencies substantially larger than $f_c$. By making the roll-off rate R equal to the "roll-on" rate of the output signal appearing on terminal 67, the high frequency output of amplifier 68 will be proportional to output signal Z. Transducer 71 responds to output signal Z to provide a signal on terminal 72 which is proportional to function Z. Roll-off amplifier 73 which is fashioned to have a half-power frequency $f_c$ and a high frequency roll-off rate identical to that of amplifier 68, receives this signal from transducer 71 and provides a signal at its output terminal 74 which has its high frequency components suppressed. Next, the output signals from amplifiers 68 and 73 are combined in summing junction 76 to provide a composite feedback signal. This composite feedback signal (commonly called error signal) unites with the driving function signal impressed upon terminal 61 in a manner similar to that described in conjunction with FIGURE 1, thereby completing the feedback loop.

It may be noted that the concept of this invention is not limited to the use of only two feedback loops. Nor, is it absolutely necessary that the feedback transducers, such as transducers 66 and 71, have common inputs.

One other area of useful application of the present invention is in high speed pen recorders. In such a recorder a potentiometer could be used as the position sensitive transducer and a drag type unit, such as a coil moving along a magnet, could be used as the velocity sensitive transducer. The present invention also has application in controlling the output amplitude of public address systems. In this application a crystal microphone and a capacitor microphone could be used respectively as the amplitude sensitive and velocity sensitive feedback transducers; one of these devices being responsive to magnitude of loudness, the other being sensitive to the time rate of change of loudness.

The invention should be construed liberally and it will be understood that various changes and modifications may be made without departing from the spirit and scope of the present invention. Hence, the scope of the invention is intended to be limited only by the terms of the following claims.

What is claimed is:

1. In a system for controlling a time varying output function, the feedback combination comprising:
   (a) a first feedback loop including a rate sensitive transducer responsively generative of a first signal of a predetermined roll-on rate whose amplitude closely follows the time rate of change of said output function; and a first roll-off means having a corner frequency $f_c$, having a flat frequency response at frequencies substantially below said corner frequency and having at frequencies substantially higher than the corner frequency a roll-off rate substantially equal to said roll-on rate of said first transducer, said roll-off means disposed to receive at a first input terminal said first signal from said first transducer and reponsively provide a rolled-off first output signal at a first output channel,
   (b) at least a second feedback loop including a position sensitive transducer responsively generative of a second signal proportionate to the instantaneous value of said output function; a second roll-off means having a frequency response characteristic substantially equivalent to the frequency response characteristic of said first roll-off means, said second roll-off means provided with an input channel to receive said second signal and responsively provide a rolled-off second output signal at a second output channel; and
   (c) summing means disposed to receive and add said output signals at least from said output channels of said first and second roll-off means.

2. In a system for controlling the sweep of the field of a magnet, the feedback combination comprising:
   (a) a first feedback loop including,
      a first transducer adapted to generate in response to a magnetic field a first feedback signal proportionate to the time rate of change of said magnetic field, and
      first signal roll-off means disposed to operatively receive said first feedback signal from said first transducer and responsively generate a first output signal, said first signal roll-off means being fashioned to exhibit the following frequency response characteristics: a corner frequency $f_c$, a flat frequency response at frequencies below said corner frequency, and an approximately six decibel per octave roll-off rate at frequencies above said corner frequency,
   (b) at least a second feedback loop including,
      a second feedback transducer adapted to generate in response to a magnetic field a second feedback signal closely following the instantaneous value of said magnetic field, and
      second roll-off means disposed to operatively receive said second feedback signal from said second transducer and responsively generate a second output signal, said second roll-off means being fashioned to exhibit a frequency response characteristic closely similar to the frequency response characteristic of said first roll-off means, and
   (c) summing means operatively disposed to receive said output signals at least from said first and second roll-off means.

3. In a system for controlling the sweep of the magnetic field of a magnet, the feedback circuit comprising:
   (a) a first feedback loop including,
      an induction coil gaussmeter adapted to detect the rate of change of said magnetic field, and
      a first operational amplifier connected to receive a signal generated by said induction coil gaussmeter in response to a change in said magnetic field, said amplifier comprising a high gain direct current amplifier having input and output channel, said input channel including an input resistor operatively serially connected to receive said input signal from said induction coil gaussmeter, a feedback resistor connected between said input and output channels, and a feedback capacitor connected to shunt said feedback resistor, said first amplifier responsive to said signal from said induction coil gaussmeter by generating a first output signal;
   (b) at least a second feedback loop including,
      a Hall effect gaussmeter adapted to detect the instantaneous relative magnitude of said magnetic field, and
      a second operational amplifier connected to receive a signal generated by said gaussmeter in response to said magnetic field, said amplifier comprising a high gain direct current amplifier having input and output channels, said input channel including an input resistor operatively serially connected to receive said signal from said Hall effect gaussmeter, a feedback resistor connected between said input and output channels, and a feedback capacitor connected to shunt said feedback resistor, said second amplifier responsive to said signal from said Hall effect gaussmeter by generating a second output signal; and
   (c) summing means operatively disposed to receive said output signals at least from said first and second operational amplifiers.

4. That system recited in claim 3 further including means to adjust the relative amplitude of said output signals generated by said first and second operational amplifiers.

5. In a method for controlling a time varying output function, the steps comprising:
   (a) generating a first signal whose amplitude closely follows the time rate of change of said output function,
   (b) attenuatively modifying said first signal approximately proportionately according to the relationship
   $$\frac{1}{jw\tau+1}$$
   where $w = 2\pi \times$ frequency and
   $$\tau = \frac{1}{2\pi \times (\text{corner frequency})}$$
   (c) generating a second signal whose amplitude closely follows the instantaneous amplitude of said output functions
   (d) attenuatively modifying said second signal approximately proportionately according to the aforesaid relationship
   $$\frac{1}{jw\tau+1}$$
   and
   (e) multiplexing said first and second signals as modified to provide a composite wideband feedback control signal which linearly follows said output function over a wide band of frequencies.

6. That method recited in claim 5 above further including the step of:

equalizing the amplitudes of said first signal as modified and said second signal as modified to provide an amplitude-frequency linear feedback signal.

7. In a method for controlling the sweep of the magnetic field of a magnet, the steps comprising:
  (a) generating a first signal whose amplitude closely follows the time rate of change of said magnetic field,
  (b) attenuatively modifying said first signal approximately proportionately according to the relationship $$\frac{1}{jw\tau+1}$$

where
$w = 2\pi \times$ frequency and $$\tau = \frac{1}{2\pi \times (\text{corner frequency})}$$

(c) generating a second signal whose amplitude closely follows the instantaneous amplitude of said magnetic field,
  (d) attenuatively modifying said second signal approximately proportionately according to the aforesaid relationship $$\frac{1}{jw\tau+1}$$

and
  (e) multiplexing said first and second signals as modified to provide a composite wideband feedback signal for control of the aforesaid magnetic field.

8. In a method for controlling the sweep of the magnetic field of a magnet, the steps comprising:

(a) detecting the magnitude of said magnetic field,
  (b) generating in response to the magnitude of said magnetic field, a first signal whose amplitude closely follows the time rate of change of said magnetic field,
  (c) attenuatively modifying said first signal approximately proportionately according to the relationship $$\frac{1}{jw\tau+1}$$

where
$w = 2\pi \times$ frequency and $$\tau = \frac{1}{2\pi \times (\text{corner frequency})}$$

(d) generating in response to the magnitude of said magnetic field a second signal whose amplitude closely follows the instantaneous magnitude of said magnetic field,
  (e) attenuatively modifying said second signal approximately proportionately according to the aforesaid relationship $$\frac{1}{jw\tau+1}$$

and
  (f) multiplexing said first and second signals as modified to provide a composite wideband feedback signal for control of the aforesaid magnetic field.

No references cited.

LEE T. HIX, *Primary Examiner*.

J. A. SILVERMAN, *Assistant Examiner*.